United States Patent [19]

Yamaguchi et al.

[11] 4,202,927
[45] May 13, 1980

[54] MAGNETIC RECORDING MEDIUM

[75] Inventors: Nobutaka Yamaguchi; Satoru Takayama; Masaki Fujiyama, all of Odawara, Japan

[73] Assignee: Fuji Photo Film Co., Ltd., Minami-ashigara, Japan

[21] Appl. No.: 945,258

[22] Filed: Sep. 25, 1978

Related U.S. Application Data

[63] Continuation of Ser. No. 836,710, Sep. 26, 1977, abandoned.

[30] Foreign Application Priority Data

Sep. 29, 1976 [JP] Japan .................................. 51-116026

[51] Int. Cl.$^2$ ............................................. H01F 10/00
[52] U.S. Cl. .................................. 428/323; 428/328; 428/329; 428/337; 428/339; 428/341; 428/342; 428/411; 428/412; 428/422; 428/474; 428/480; 428/523; 428/457; 428/539; 428/900; 427/48; 427/128; 427/132

[58] Field of Search ................... 427/128, 132, 48; 428/323, 328, 329, 337, 339, 341, 342, 411, 412, 422, 474, 480, 523, 457, 539, 900

[56] References Cited

U.S. PATENT DOCUMENTS 3,617,378  11/1971  Beck ..................................... 117/226
3,647,539  3/1972  Weber .................................. 428/900

Primary Examiner—Bernard D. Pianalto
Attorney, Agent, or Firm—Armstrong, Nikaido, Marmelstein & Kubovcik

[57] ABSTRACT

This invention relates to a magnetic recording medium comprising a support base having a surface roughness of at most 0.33 micron, a magnetic recording layer having a Young's modulus of at least $5 \times 10^{10}$ dyne/cm$^2$ and being provided on one side of the base and a cationic surface active agent layer provided on the other side of the base in a proportion of 0.2 to 500 mg/m$^2$.

12 Claims, No Drawings

MAGNETIC RECORDING MEDIUM

This is a continuation, of application Ser. No. 836,710, filed Sept. 26, 1977 and now abandoned.

BACKGROUND OF THE INVENTION

1. Field of the Invention

The present invention relates to a magnetic recording medium comprising a magnetic recording layer on a non-magnetic support member and more particularly, it is concerned with a magnetic recording medium having an improved surface property.

2. Description of the Prior Art

In the recent video tapes, recording wavelength of 2 microns or less, in particular, about 1.5 microns have often been used.

In order to obtain a good image quality, it has been desired to increase the S/N ratio by increasing the signal output (S) and decreasing the noise level (N). As a method for decreasing the noise level by improving a magnetic layer, there have been made various proposals, for example, comprising using dispersing machines, main binders or dispersing agents, which serve to increase the dispersibility of magnetic substances, or comprising removing materials decreasing the dispersibility of magnetic substances, such as synthetic rubbers. In addition, as an effective method for decreasing the noise level, it has also been proposed to use a base having a smooth surface without changing the magnetic coating composition and the operations for preparing and applying the coating composition. The surface smoothness of a base is closely related with that of a coating film. That is to say, a good smoothness base gives a smooth coating surface and rough surface base give a rough coating surface. On the other hand, the width of a head track has lately been narrowed to about 50 to 70 microns from 100 to 150 microns in the prior art and even small dusts thus ten to be detected as drop outs, so that drop outs be largely increased at a base surface roughness of 0.33 micron or less. Furthermore, in a magnetic recording medium using a base with a surface smoothness of 0.33 micron or less, the base surface opposite to the magnetic layer is more readily scraped during running in a VTR than that using a base with a rough surface and transferred to the magnetic layer, resulting in increase of drop outs.

SUMMARY OF THE INVENTION

It is an object of the invention to provide a magnetic recording medium having a magnetic recording layer on a non-magnetic support.

It is another object of the invention to provide a magnetic medium with an improved surface smoothness.

It is a further object of the invention to provide a magnetic recording medium with a drastically decreased drop out increasing ratio even by repeated use.

It is a still further object of the invention to provide a magnetic recording medium in which a high smoothness base can be used without increasing drop outs.

These objects can be attained by a magnetic recording medium which comprises a support base having a surface roughness of 0.33 micron or less, a magnetic recording layer having a Young's modulus of $5 \times 10^{10}$ dyne/cm$^2$ or more and being provided on one side of the base and a cationic surface active agent layer provided on the other side of the base in a proportion of 0.2 to 500 mg/m$^2$.

DETAILED DESCRIPTION OF THE INVENTION

We, the inventors, have found that using the foregoing recording wavelength and video track width, drop outs are increased more than expected in the prior art and this is not due to that the recording wavelength becomes short but is mainly due to scraping of the base surface by the friction with the tape-path of a VTR. Thus, we have considered how to cope with the situation and consequently have found that such a problem can be solved by a magnetic recording tape which comprises a support base having a surface roughness of 0.33 micron or less, a magnetic recording layer having a Young's modulus of $5 \times 10^{10}$ dyne/cm$^2$ or more and being provided on one side of the base and a cationic surface active agent layer provided on the other side of the base in a proportion of 0.2 to 500 mg/m$^2$. The present invention is based on this finding. In the present invention, limitation of the surface roughness to 0.33 micron or less is to decrease the noise level as well as to increase the signal output and limitation of the Young's modulus of a magnetic layer to $5 \times 10^{10}$ dyne/cm$^2$ or more is to prevent head clogging.

In the magnetic recording medium of the present invention, the support base has a surface roughness of 0.35 micron or less, measured by means of a Stylus-type roughness tester, and 0.22 micron or less, measured by means of an interference microscope, and the thickness of the support is not particularly limited, but, preferably, ranges from 2 to 38 microns. As the support base, there can be used ordinary materials, for example, polyesters such as polyethylene terephthalate and polyethylene-2,6-naphthalate, polyolefine such as polyethylene and polypropylene, cellulose derivatives such as cellulose triacetate and cellulose diacetate and other plastics such as polycarbonates, polyamides, polyimides, polytetrafluoroethylene, polytrifluoroethylene, polyvinyl chloride and polyvinylidene chloride.

Useful examples of the ferromagnetic fine powders which can be used in the magnetic recording layer of the present invention are $\gamma$-Fe$_2$O$_3$, Co-doped $\gamma$-Fe$_2$O$_3$, Fe$_3$O$_4$, Co-doped Fe$_3$O$_4$, Berthollide compounds of $\gamma$-Fe$_2$O$_3$ and Fe$_3$O$_4$ (FeO$_x$: $1.33<x<1.50$), Co-doped Berthollide compounds of $\gamma$-Fe$_2$O$_3$ and Fe$_3$O$_4$ (FeO$_x$: $1.33<x<1.50$), CrO$_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973, U.S. Pat. Nos. 3,026,215, 3,031,341, 3,100,194, 3,242,005 and 3,389,014, British Patent Nos. 752,659, 782,762 and 1,007,323, French Patent No. 1,107,654 and West German Patent OLS No. 1,281,334.

The ferromagnetic fine powders have a particle size of about 0.2 to 1 micron in length with a length to width ratio of 1:1 to 20:1. The magnetic recording layer must have a Young's modulus of $5 \times 10^{10}$ dyne/cm$^2$ or more, which is prepared by mixing the ferromagnetic fine powder with a binder followed by applying to a support.

This Young's modulus range can be realized by the methods comprising:

(1) Using a magnetic substance having an increased acicular ratio, for example, 5:1 or more,
(2) changing the ratio by weight of magnetic substance to binder, that is, in general, decreasing the ratio of magnetic substance to binder,
(3) orientating strongly a magnetic substance in the longitudinal direction by strengthening the magnetic field orientation after coating,
(4) decreasing or removing carbon black added ordinarily to a magnetic layer and
(5) decreasing the quantity of an oily lubricant.

In the method (1), for example, a tape having a large Young's modulus (E mag) is obtained by the use of a magnetic substance having a large grain size and large acicular ratio with the following composition:

| Composition | |
| --- | --- |
| Co-added Ferromagnetic Iron Oxide ($Fe_3O_4$ Co 1.5 atomic % to Fe) | 300 g |
| Polyvinylidene Chloride | 25 g |
| Oleic Acid | 1 g |
| Alumina ($Al_2O_3$) | 5 g |
| Epoxy Resin | 10 g |
| Polyamide | 15 g |
| Carbon Black | 5 g |

Table 1

| | Grain Size of Magnetic Substance | Emag (dyne/$cm^2$) |
| --- | --- | --- |
| No. 1 | 1.2$\mu$ × 0.15$\mu$ × 0.15$\mu$ | 13 × $10^{10}$ |
| 2 | 1.0$\mu$ × 0.13$\mu$ × 0.13$\mu$ | 10 × $10^{10}$ |
| 3 | 0.6$\mu$ × 0.1$\mu$ × 0.1$\mu$ | 8 × $10^{10}$ |
| 4 | 0.3$\mu$ × 0.06$\mu$ × 0.06$\mu$ | 4 × $10^{10}$ |

In the method (2), for example, using the same composition as that of the method (1), the ratio by weight of magnetic substance/binder only is changed as follows:

Table 2

| | Magnetic Substance/Binder* Ratio by weight | Emag (dyne/$cm^2$) |
| --- | --- | --- |
| No. 1 | 300/70 | 11 × $10^{10}$ |
| 2 | 300/60 | 9 × $10^{10}$ |
| 3 | 300/50 | 8 × $10^{10}$ |
| 4 | 300/40 | 6 × $10^{10}$ |
| 5 | 300/30 | 3 × $10^{10}$ |

*Binder: Polyvinylidene Chloride, Epoxy Resin, Polyamide Weight Ratio of Three Components = constant In the method (3), for example, a magnetic coating composition having the following formulation is coated onto a plastic support (base) and directly passed through a magnetic field to orientate the magnetic substance (usually acicular) in the longitudinal direction.

| Composition | |
| --- | --- |
| Co-added Ferromagnetic Iron Oxide ($\gamma$-$Fe_2O_3$ (0.6$\mu$ × 0.1$\mu$ × 0.1$\mu$) Co 2 atomic % to Fe) | 300 g |
| Polyvinyl Chloride Actate | 30 g |
| Stearic Acid | 2 g |
| Chromium Oxide ($Cr_2O_3$) | 5 g |
| Polyisocyanate | 30 g |
| Carbon Black | 3 g |

The degree of orientation is strengthened to increase Emag.

Table 3

| | Orientation Current (A) | Squareness Ratio (Br/Bm) | Emag (dyne/$cm^2$) |
| --- | --- | --- | --- |
| No. 1 | 0 | 0.5 | 3 × $10^{10}$ |
| 2 | 5 | 0.6 | 5 × $10^{10}$ |
| 3 | 10 | 0.7 | 7 × $10^{10}$ |
| 4 | 20 | 0.83 | 9 × $10^{10}$ |
| 5 | 50 | 0.85 | 10 × $10^{10}$ |

Strength of Magnetic Field: 2500 Oe

In the method (4), for example, the quantity of carbon black added ordinarily to a magnetic layer for the antistatic purpose is decreased to raise the Young's modulus (E mag) using the following composition:

| Composition | |
| --- | --- |
| Ferromagnetic Iron Oxide [$\gamma$-$Fe_2O_3$ (0.4 $\mu$ × 0.06 $\mu$ × 0.06 $\mu$)] | 300 g |
| Nitrocellulose | 60 g |
| Dibutyl Phthalate | 5 g |
| Acrylic Acid Ester | 8 g |
| Silicone Oil | 0.5 g |
| Polyisocyanate | 5 g |
| Carbon Black | Variable |

Table 4

| | Carbon black (g) | Emag (dyne/$cm^2$) |
| --- | --- | --- |
| No. 1 | 0 | 7 × $10^{10}$ |
| 2 | 1 | 6.5 × $10^{10}$ |
| 3 | 5 | 6 × $10^{10}$ |
| 4 | 10 | 5 × $10^{10}$ |
| 5 | 20 | 4 × $10^{10}$ |
| 6 | 30 | 3 × $10^{10}$ |

In the method (5), for example, using the same composition as that of the method (1), the quantity of the oleic acid is changed to examine the change of the Young's modulus correspondingly.

Table 5

| | Grain Size of Magnetic Substance | Oleic Acid (g) | Emag (dyne/$cm^2$) |
| --- | --- | --- | --- |
| No. 1 | 0.6 $\mu$ × 0.1 $\mu$ × 0.1 $\mu$ | 0 | 10 × $10^{10}$ |
| 2 | do | 0.5 | 9 × $10^{10}$ |
| 3 | do | 1 | 8 × $10^{10}$ |
| 4 | do | 2 | 5 × $10^{10}$ |
| 5 | do | 3 | 1 × $10^{10}$ |
| 6 | do | 5 | 0.8 × $10^{10}$ |

As apparent from the result, the Young's modulus is increased with the decrease of the quantity of the lubricant.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of the order of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylateacrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber-based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition and the like. Of these resins, preferable resins are those which do not soften or melt before the resin thermally decomposes. Typical examples of these resins are phenol resins, epoxy resins, polyurethane hardening type resins, urea resins, melamine resins, alkyd resins, silicone resins, acryl-based reactive resins, epoxy-polyamide resins, mixtures of high molecular weight polyester resins and isocyanate prepolymers, mixtures of methacrylic acid salt copolymers and diisocyanate prepolymers, mixtures of polyesterpolyols and polyisocyanates, urea-formaldehyde resins, mixtures of low molecular weight glycols, high molecular weight diols and triphenylmethane triisocyanate, polyamide resins and mixtures thereof, etc. Examples of these resins are described in, for example, Japanese Patent Publication Nos. 8103/1964, 9779/1965, 7192/1966, 14275/1966, 18179/1967, 8016/1966, 12081/1968, 28023/1969, 14501/1970, 13103/1971, 22065/1972, 22066/1972, 22067/1972, 22072/1972, 22073/1972, 28045/1972, 28048/1972, 28922/1972 and U.S. Pat. Nos. 3,144,353, 3,320,090, 3,437,510, 3,597,273, 3,781,210, 3,781,211, etc. These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

In addition to the above described binder and ferromagnetic fine powder, other additives such as dispersing agents, lubricants, abrasives, antistatic agents and the like can be added to the magnetic recording layer.

Formation of the magnetic layer is carried out by dissolving or dispersing the above described composition in an organic solvent and then coating the composition onto a support.

Typical organic solvents which can be used in the coating composition include ketones such as acetone, methyl ethyl ketone, methyl isobutyl ketone, cyclohexane and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbon such as benzene, toluene, xylene and the like; chlorinated hydrocarbons such as methylene chloride, ethylene chloride, carbon tetrachloride, chloroform, ethylene chlorohydrin, dichlorobenzene and the like.

The magnetic layer coated onto a support in this way is then dried to give a Young's modulus of $5 \times 10^{10}$ dyne/cm$^2$ or more.

As the cationic surface active agent, it is preferable to use a quaternary ammonium salt represented by the general formula,

more preferably, wherein $R_1=R_2=H$, $CH_3$, $C_2H_5$, $C_3H_7$, $C_4H_9$, or

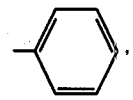

$R_3=-CH_2-CH_2OH$ or $-CH_2-CH_2-CH_2-OH$, $R_4=C_nH_{2n+1}CONH-(CH_2-)_m$ or $C_nF_{2n+1}CONH-(CH_2-)_m$ wherein n=6-24 and m=2-6 and X=F, Cl, Br, I, $\frac{1}{2}SO_4$, $NO_3$, $NO_2$, $ClO_4$ or $CrO_3$. The quantity of the cationic surfactant to be coated ranges from 0.2 to 500 mg/m$^2$, preferably, from 0.5 to 200 mg/m$^2$.

The effects or advantages obtained by the use of the magnetic recording tape according to the present invention are summarized below:

(1) The drop out increasing ratio by repeated use can be drastically decreased.
(2) No head clogging takes place.
(3) As a countermeasure for drop out, it is not necessary to use a support base with a bad surface smoothness. Rather, since a high smoothness base can be used, the video color noise is decreased.
(4) Short wavelength recording with a wavelength of 2 microns or less and use of a video head track width of 100 microns or less are made possible and, therefore, high density recording of about 2 times as much as the prior art in the longitudinal direction of a tape is possible.

The present invention can be applied to video tapes for short wavelength recording with marked advantages, but can also be applied to data recorder tapes, memory tapes, audio tapes, etc.

The present invention will be explained in detail with reference to the following examples. It will be obvious to one skill in the art that various changes and modifications can be made in the components, ratios, operational order and the like without departing from the spirit of the present invention. Therefore, the present invention should not be construed as being limited to the following examples.

EXAMPLE 1

One side of a polyethylene terephthalate base having a thickness of 14 microns was coated with a magnetic layer having the following composition to give a coating thickess of 4 microns on dry base and then subjected to a calendering treatment in known manner in the production of vides tapes.

The other side of this tape was coated with (tanac SN (commercial name, manufactured by American Cyanamid Co.,

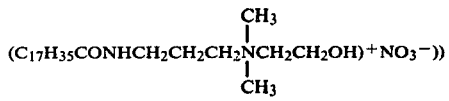

dissolved in ethyl alcohol under various conditions, dried and cut in a width of ½ inch, followed by measurement of the various properties.

| Ferromagnetic Iron Oxide ($\gamma$-$Fe_2O_3$, grain size: 0.4 × 0.06 × 0.06$\mu$) | 300 g |
|---|---|
| Nitrocellulose | 60 g |
| Dibutyl Phthalate | 5 g |
| Acrylic Acid Ester | 8 g |
| Silicone Oil | 0.5 g |
| Polyisocyanate | 5 g |

Table 6

| Sample No. | Amount of Active Agent (mg/m$^2$) | Surface Roughness of Base ($\mu$) | Drop Out Increasing Ratio A | Video Color Noise | Drop Out Increasing Ratio B | Young's Modulus of Magnetic Layer (dyne/cm$^2$) |
|---|---|---|---|---|---|---|
| 1 | 0 | 0.33 | 16.5 | −2.5 | 2.7 | 5 × 10$^{10}$ |
| 2 | 0 | 0.56 | 7.5 | +1.1 | 2.0 | 5 × 10$^{10}$ |
| 3 | 0.2 | 0.33 | 2.5 | −2.5 | 1.2 | 5 × 10$^{10}$ |
| 4 | 1 | 0.33 | 1.1 | −2.5 | 1.0 | 5 × 10$^{10}$ |
| 5 | 5 | 0.33 | 1.0 | −2.5 | 1.0 | 5 × 10$^{10}$ |
| 6 | 10 | 0.33 | 1.0 | −2.5 | 1.0 | 5 × 10$^{10}$ |
| 7 | 50 | 0.33 | 0.95 | −2.5 | 0.9 | 5 × 10$^{10}$ |
| 8 | 100 | 0.33 | 1.0 | −2.5 | 1.0 | 5 × 10$^{10}$ |
| 9 | 500 | 0.33 | 1.0 | −2.5 | 1.0 | 5 × 10$^{10}$ |
| 10 | 1000 | 0.33 | 5.3 | −2.5 | 1.9 | 5 × 10$^{10}$ |
| 16 | 60 | 0.27 | 1.0 | −3.0 | 0.95 | 6 × 10$^{10}$ |
| 17 | 60 | 0.2 | 1.0 | −3.2 | 1.0 | 6 × 10$^{10}$ |
| 18 | 60 | 0.15 | 1.1 | −4 | 1.0 | 6 × 10$^{10}$ |
| 11 | 50 | 0.42 | 0.95 | +0.5 | 1.0 | 5 × 10$^{10}$ |
| 12 | 50 | 0.56 | 0.9 | +1.1 | 1.0 | 5 × 10$^{10}$ |

Method of Assessment (1) Drop Out Increasing Ratio A

Recording was carried out with a video track width of 60 microns, a relative speed to a video head of 7.8 m/sec and a signal of 4 MHz. Using a Drop Out Counter (IDC-2, manufactured by Nippon Jido Seigyo Co., measurement conditions: 15 $\mu$sec, 18 dB), the number of drop outs ($DO_1$) at the first reproduction and the number of drop outs ($DO_{50}$) at the 50th reproduction were counted and the drop out increasing ratio was calculated from the following formula, Drop Out Increasing Ratio = $DO_{50}/DO_1$ (2) Video Color Noise Measurement was carried out using a Noise Meter 925 C type manufactured by Shibasoku Co., Ltd., and a signal generator (16 UIA Plug-in Unit) of Color Video Noise Meter TG-5C. The noise is large as + is increased.

(3) Drop Out Increasing Ratio B

In an analogous manner to (1) Drop Out Increasing Ratio A, measurement was carried out with a video track width of 120 microns, relative speed to a video head of 10 m/sec and signal of 4 MHz.

EXAMPLE 2

When assessment of the surface property was carried out as to Sample Nos. 7, 11, 12, 16, 17 and 18 prepared by adjusting the surface property of the base of Sample No. 7 in Example 1 to 0.33 micron, 0.42 micron, 0.56 micron, 0.27 micron, 0.2 micron and 0.15 micron, their video color noises were respectively −2.5 dB, +0.5 dB, +1.1 dB, −3.0 dB, −3.2 dB and −4.0 dB. When these values were judged by the real television images, it was found that the color noise level had to be 0 dB or less and thus the surface roughness of the base had to be 0.33 micron or less. In these cases, the drop out increasing ratios A were respectively 0.95, 0.95, 0.9, 0.95, 1.0 and 1.0.

EXAMPLE 3

Sample Nos. 13 to 15 were prepared by changing the Young's modulus of the magnetic layer of Sample No. 7 in Example 1 to 2×10$^{10}$ to 10×10$^{10}$ dyne/cm$^2$ and then subjected to various assessments.

Table 7

| Sample No. | Amount of Active Agent (mg/m$^2$) | Surface Roughness of Base ($\mu$) | Drop Out Increasing Ratio A | Video Color Noise (dB) | Head Clogging | Young's Modulus of Magnetic Layer (dyne/cm$^2$) |
|---|---|---|---|---|---|---|
| 13 | 50 | 0.33 | 17.5 | −2.5 | occurred | 2 × 10$^{10}$ |
| 14 | 50 | 0.33 | 4.1 | −2.5 | occurred | 3 × 10$^{10}$ |
| 7 | 50 | 0.33 | 0.95 | −2.5 | no | 5 × 10$^{10}$ |
| 15 | 50 | 0.33 | 0.9 | −2.5 | no | 10 × 10$^{10}$ |

Method of Assessment (1) Video Head Clogging

The video head clogging was judged depending upon whether a drop out of 10 H or more occurred during measurement of Drop Out Increasing Ratio A or not. Increase of drop outs was due to scraping of the base. Head clogging was prevented by hardening a magnetic layer, because the scraped powder hardly adhered to the magnetic layer and, even if adhered thereto, it was readily removed therefrom.

From Examples 1 to 3, we have reached the following conclusions:

(1) It is apparent from the difference between Drop Out Increasing Ratios A and B in Sample Nos. 1 and 2 of Example 1 that the drop out increasing ratio depends upon the recording condition and the surface property of a base and the worst combination is a narrow video track width and good base surface property.

(2) The effect of the cationic surface active agent is apparent from Sample Nos. 2 to 9 in Example 1. The quantity of the surface active agent is preferably 0.2 to 500 mg/m² in view of the drop out increasing ratio.

(3) From Example 2, the surface roughness of a base is preferably 0.33 micron or less in view of the color noise level.

(4) From Example 3, the Young's modulus of a magnetic layer is preferably $5 \times 10^{10}$ dyne/cm² in view of the video head clogging.

What is claimed is:

1. A magnetic recording medium consisting of a support base having a surface roughness of at most 0.33 micron;

a magnetic recording layer having a Young's modulus of at least $5 \times 10^{10}$ dyne/cm² and being provided on one side of the base; and a back-coating layer provided on the other side of the base in an amount of 0.2 to 500 mg/m², said back-coating layer consisting of a quaternary ammonium salt represented by the general formula:

$$[R_1R_2R_3R_4N]^+X^-$$

wherein $R_1=R_2=$H, CH₃, C₂H₅, C₃H₇, C₄H₉ or

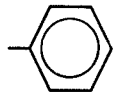

$R_3=$—CH₂CH₂OH or —CH₂CH₂CH₂OH;
$R_4=C_nH_{2n+1}CONH(C_mH_{2m})$— or
$C_nF_{2n+1}CONH(C_mH_{2m})$—
wherein n=6-24 and m=2-6; and
X=F, Cl, Br, I, ½SO₄, NO₃, NO₂, ClO₄ or CrO₃.

2. The magnetic recording medium as claimed in claim 1 wherein the Young's modulus of the magnetic recording layer is adjusted to at least $5 \times 10^{10}$ dyne/cm² by decreasing the quantity of oily lubricant in the layer.

3. The magnetic recording medium as claimed in claim 1 wherein the Young's modulus of the magnetic recording layer is adjusted to at least $5 \times 10^{10}$ dyne/cm² by decreasing the ratio of magnetic substance to binder in the layer.

4. The magnetic recording medium as claimed in claim 1 wherein the Young's modulus of the magnetic recording layer is adjusted to at least $5 \times 10^{10}$ dyne/cm² by the use of a magnetic substance with an increased acicular ratio in the layer.

5. The magnetic recording medium as claimed in claim 1 wherein the Young's modulus of the magnetic recording layer is adjusted to at least $5 \times 10^{10}$ dyne/cm² by decreasing the quantity of carbon black in the layer.

6. The magnetic recording medium as claimed in claim 1 wherein the Young's modulus of the magnetic recording layer is adjusted to at least $5 \times 10^{10}$ dyne/cm² by orienting strongly a magnetic substance in the longitudinal direction in the layer.

7. The magnetic recording medium as claimed in claim 1, wherein the support base is of a material selected from the group consisting of polyesters such as polyethylene terephthalate and polyethylene-2,6-naphthalate, polyolefins such as polyethylene and polypropylene, cellulose derivatives such as cellulose triacetate and cellulose diacetate and other plastics such as polycarbonates, polyamides, polyimides, polytetrafluoroethylene, polytrifluoroethylene, polyvinyl chloride and polyvinylidene chloride.

8. The magnetic recording medium as claimed in claim 1, wherein the support base has a thickness of 2 to 38 microns.

9. The magnetic recording medium as claimed in claim 1, wherein the magnetic recording layer is prepared from a composition comprises a ferromagnetic fine powder, binder and coating solvent.

10. The magnetic recording medium as claimed in claim 9, wherein the ferromagnetic fine powder is selected from the group consisting of γ-Fe₂O₃, Co-doped γ-Fe₂O₃, Fe₃O₄, Co-doped Fe₃O₄, Berthollide compounds of γ-Fe₂O₃ and Fe₃O₄, Co-doped Berthollide compounds of γ-Fe₂O₃ and Fe₃O₄, CrO₂, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

11. The magnetic recording medium as claimed in claim 9, wherein the binder is selected from the group consisting of thermoplastic resins, thermosetting resins and mixtures thereof.

12. The magnetic recording medium as claimed in claim 9, wherein the coating solvent is selected from the group consisting of ketones, alcohols, esters, ethers, glycol ethers, aromatic hydrocarbons, chlorinated hydrocarbons, tetrahydrofuran and dimethyl sulfoxide.

* * * * *